May 27, 1924.                                              1,495,551
                    G. L. DES YLOUSES
       HIGH NITROGEN GRADE CYANAMIDE GRANULE MAKING PROCESS
                    Filed Jan. 17, 1922
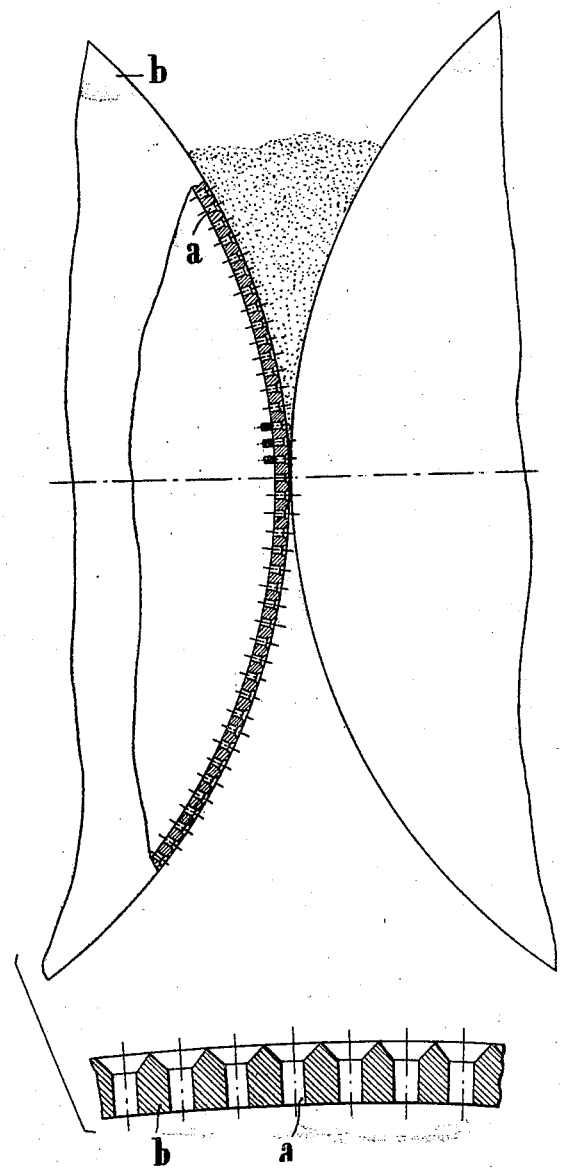
INVENTOR:
Gaston Lefort des Ylouses
BY
ATTORNEY Patented May 27, 1924.

1,495,551

UNITED STATES PATENT OFFICE.

GASTON LEFORT DES YLOUSES, OF PARIS, FRANCE, ASSIGNOR TO LA SOCIETE L'AZOTE FRANCAIS SIEGE SOCIAL, OF PARIS, FRANCE.

HIGH NITROGEN GRADE CYANAMIDE-GRANULE-MAKING PROCESS.

Application filed January 17, 1922. Serial No. 529,902.

*To all whom it may concern:*

Be it known that I, GASTON LEFORT DES YLOUSES, citizen of the Republic of France, and resident of Paris, France (post-office address 126 Rue de Provence), have invented a new and useful High Nitrogen Grade Cyanamide-Granule-Making Process, which improvements are fully set forth in the following specification.

Granulation of cyanamide, which constitutes a very important but most delicate operation, has been obtained by numerous processes.

The following requirements must, however, be answered, namely: that the granules formed do not collapse into dust in a few weeks or even months; that the granulating operation does not cause too considerable an escape of nitrogen (as ammonia); that the granules obtained do not lose too great a portion of their nitrogen (as ammonia) between making and using, i. e. generally after a few months; that the per cent of cyanamide transformed into dicyandiamide be weak; and lastly that the per cent of agglomerating agent be sufficiently small to enable the nitrogen grade of the obtained granules to remain marketable.

From this last named point of view any process involving a total weight of agglomerating agents calculated to lower too much the cyanamide grade must be discarded.

As concerns the proportion of cyanamide transformed into dicyandiamide, Hager's and Kern's researches have shown that it increases quickly according to the quantity of water added to the raw cyanamide.

While the transformation is 16.8%, in four months, with 25% of water added to raw cyanamide, it reaches, in the same time, up to 62.3% with 50% of water added: hence, the maximum quantity of water permissible for granulation should not exceed 25%.

The per cent of nitrogen lost by the granules, once made, which loss takes place in the form of ammonia, is the higher the more water the product contains. The greater the quantity of water added to the mass, the higher the per cent of nitrogen lost in the course of granulation. Such loss increases considerably if acid substances or certain salts, such as aluminum, magnesium, or potassium chlorides or sulphates are used as agglomerants. The objectionable effect of those salts decreases in the order in which they are named.

Lastly, the only granules that are stable and will not collapse into dust are those which have undergone very high compression during manufacture.

The present invention relates to a process for making stable cyanamide granules of high nitrogen content, such process being characterized by the facts, that extremely high pressure is exerted on raw cyanamide treated in small quantities, that the amount of water added does not exceed from 15 to 20%, and that the water and the cyanamide form an absolutely homogeneous paste or mixture with no excessive rise in temperature, the pressure being preferably exerted by oppositely rotated cylinders, at least one of which is provided with numerous holes or perforations for the expulsion of the cyanamide therethrough. The holes may advantageously taper inwards so as to work in the same way as the perforations of a drawing plate.

As prepared, the mixture is fed between the two cylinders and thus forced through the holes under very high pressure. Due to the rotation of the cylinders the cyanamide filaments break into short bits, which constitute the granules and are constantly ejected. The granules so formed are left alone until completely hardened, such hardening requiring a few hours. During this period, the granules should be spread in a thin layer, in order that diffusion of heat may readily take place. Were they heaped up, the temperature would rise rapidly and the loss of nitrogen become excessive.

For water may be substituted a concentrated solution of calcium nitrate. The product so obtained offers the advantage of containing both promptly assimilable nitrogen (nitrate) and reserve nitrogen (cyanamide).

The above described process is characterized by the fact that very high pressure is exerted on raw cyanamide intimately mixed with water; the quantity of cyanamide subjected to pressure being small, so as to avoid a rise of temperature on the outside. While retaining this essential characteristic of an instantaneous pressure on a small mass of cyanamide, the process may be somewhat altered as will now be explained.

The operation can be carried out in two stages, as follows: During the first stage, in which no modification in the physical condition of the cyanamide occurs, the product is moistened with about 7% of water. This moistening can be effected in any suitable container, for instance those in which the cyanamide is shipped, and the product so moistened is then spread in layers about 15 centimeters thick, undergoing but little or no kneading. The quantity of water thus added to the cyanamide is sufficient to almost completely hydrate the lime contained in the cyanamide, and the said quantity of water must, at any rate, be just sufficient to ensure that all of the water will be combined with the cyanamide. The temperature of the mass may reach up to 160° C., but should not exceed this maximum which is not high enough to cause transformation of the cyanamide into dicyandiamide. At the end of this first treatment, the cyanamide is still in the form of powder, as at the beginning, no modification having taken place as regards its physical condition. The aforesaid first operation takes from one to two hours or thereabouts.

The mass is then allowed to cool down slowly, for about ten hours at least; the reason being that it has been found necessary to allow sufficient time for the lime slaking reaction in order that the slaking be as complete and thorough as possible, due probably to the special physical condition lime assumes in cyanamide.

To the powder so obtained, 10 to 20% of water is then added and the whole is kneaded so as to form a homogeneous mixture. The kneaded and homogeneous mixture is next, as has been indicated, subjected to high and very short, or, as it might be called "instantaneous pressure", for instance between press rollers one of which is perforated. The pressure should be about 300 kilograms per square centimeter.

This pressure has been selected for the following reasons:

On the one hand, investigations relating to the part played and the effects brought about by pressure have shown that formation of dicyandiamide during compression becomes important only if pressures exceeding about 300 kilograms are used, and that such formation increases according to the pressure duration. As internal pressures subsist within the granules, it is necessary that the pressure be exerted instantly, so as to avoid continuous formation of dicyandiamide during the pressure interval.

On the other hand, experiments made by compressing under various pressures cyanamide to which various quantities of water were added have given the following results: under equal pressure, cohesion of the compressed body increases according to pressure duration. With too long pressure durations, the cohesion becomes such that lixiviation of the nitrogen contained in the compressed bodies placed in moist ground no longer occurs, or else occurs too slowly. Finally, the amount of water required to obtain a compressed body or granule having a predetermined cohesion first decreases when the pressure increases, but becomes practically constant at about 300 kilograms.

For all the foregoing reasons, compression of granules under 300 kilograms pressure seems to afford a maximum of advantages.

A preferred form of apparatus for carrying out the above-described process is illustrated in vertical section in the accompanying drawing; but no claim therefor is made herein, such apparatus forming the subject of a co-pending divisional application, No. 696,004, filed February 29, 1924.

Referring to said drawing, the perforated press cylinder $b$ is about 12 millimeters thick, and the holes $a$ through which the product is forced are flared at their outer ends but are otherwise cylindrical. Thus, by forcing under pressure the product through holes $a$ of the perforated cylinder, a series of small cylindrical strips is obtained which, on issuing from the holes, break into short bits within cylinder $b$ under the action of centrifugal force or of a suitable scraper.

Holes $a$ remain filled with cyanamide during the entire operation, each cyanamide granule remaining enclosed in the hole $a$ in which it was housed during a complete revolution of the cylinder. The material undergoes, so to say, a moulding period after the period of high pressing, and this moulding period is followed by the ejection of the material contained in the hole $a$, while such material is being replaced therein by a fresh charge. As will be apparent, the ejection of each granule is effected when the granule has assumed its final shape, and the final outer surface of the granule is the one that was in contact with the inner walls of the hole $a$ wherein it was housed.

This finally shaped thread plays an apparently important part as regards crust stability of the granules.

The time during which the material stays in the cylindrical part of the holes, after being compressed, seems of highest importance as concerns proper maintenance of the granule. By analogy, the said stay may be compared to what occurs in working with concrete: the concrete, after being cast, must remain for a more or less considerable time in the moulds until it has set, and the outer envelope has acquired sufficient cohesion to prevent the inside mass from collapsing.

Due to the above described process, granules are obtained which, when packed in ordinary bags, will not collapse into dust, but keep their shape for a practically indefinite time, whereas all the cyanamide granules made hitherto did under such conditions collapse, very rapidly, into dust and underwent incomparably heavier losses of usable nitrogen in the form of ammonia and of poisonous dicyandiamide. Despite this so obtained remarkable stability of granules, the whole of the nitrogen contained therein is rapidly extracted when they are spread as manure and put into contact with more or less damp soil, although they keep their exterior shape.

Another advantage secured by the present process is, that in the said operations, formation of dicyandiamide does not exceed from 1 to 1.5% of the nitrogen weight.

I claim as my invention:—

1. A process of granulating cyanamide, comprising adding to the cyanamide a quantity of water just sufficient to effect virtually complete hydration of the lime content of the cyanamide; spreading the moistened cyanamide in layers and allowing such layers to slowly cool; adding a further quantity of water to the cooled cyanamide and then kneading it; and then subjecting the cyanamide in small quantities to a very high, momentary pressure in molds.

2. A process of granulating cyanamide, comprising adding to the cyanamide about 7% of water to effect virtually complete hydration of its lime content; spreading the moistened cyanamide in layers and allowing such layers to slowly cool; adding from 10 to 20% of water to the cooled cyanamide and then kneading it; and then subjecting the cyanamide in small quantities to a very high, momentary pressure in molds.

3. A process of granulating cyanamide, comprising adding to the cyanamide a quantity of water just sufficient to effect virtually complete hydration of the lime content of the cyanamide; spreading the moistened cyanamide in layers and allowing such layers to slowly cool; adding a further quantity of water to the cooled cyanamide and then kneading it; subjecting the cyanamide in small quantities to a very high, momentary pressure in molds; and leaving the compressed cyanamide in the molds for an appreciable time after the compression has been completed, to permit hardening of its outer layer or crust.

4. A process of granulating cyanamide, comprising the steps of intimately mixing the cyanamide with water, and then subjecting the cyanamide in small quantities to a very high, momentary pressure in molds.

In testimony whereof I have signed this specification in the presence of a subscribing witness.

GASTON LEFORT des YLOUSES.

Witness:
    CHARLES LÉON LOISEL.